United States Patent
Aoki et al.

(10) Patent No.: US 8,135,175 B2
(45) Date of Patent: Mar. 13, 2012

(54) VEHICLE, IMAGE PROCESSING SYSTEM IMAGE PROCESSING METHOD, IMAGE PROCESSING PROGRAM, METHOD FOR CONFIGURING IMAGE PROCESSING SYSTEM, AND SERVER

(75) Inventors: Tomoyoshi Aoki, Wako (JP); Sachio Kobayashi, Wako (JP); Naoki Mori, Wako (JP); Takuma Nakamori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1022 days.

(21) Appl. No.: 11/918,674

(22) PCT Filed: May 22, 2006

(86) PCT No.: PCT/JP2006/310156
§ 371 (c)(1),
(2), (4) Date: Oct. 17, 2007

(87) PCT Pub. No.: WO2006/126490
PCT Pub. Date: Nov. 30, 2006

(65) Prior Publication Data
US 2009/0041303 A1   Feb. 12, 2009

(30) Foreign Application Priority Data
May 27, 2005   (JP) ................................. 2005-155755

(51) Int. Cl.
*G06K 9/00*   (2006.01)
(52) U.S. Cl. ........ 382/104; 340/907; 340/908; 340/909; 340/910; 340/911; 348/113; 348/114; 348/115; 348/116; 348/117

(58) Field of Classification Search .......... 382/100–104; 340/907–910, 933–937; 348/113–116
See application file for complete search history.

(56) References Cited

U.S. PATENT DOCUMENTS

| | | | |
|---|---|---|---|
| 6,591,000 B1 * | 7/2003 | Oike et al. | 382/104 |
| 6,982,635 B2 * | 1/2006 | Obradovich | 340/439 |

(Continued)

FOREIGN PATENT DOCUMENTS

JP   06-225308   *   8/1994

(Continued)

OTHER PUBLICATIONS

Machine translation for JP06-225308.*

*Primary Examiner* — Atiba O Fitzpatrick
(74) *Attorney, Agent, or Firm* — Arent Fox, LLP

(57) ABSTRACT

An image processing system and the like capable of accurately recognizing lane edges defined by dotted lane marks are provided. According to an image processing system (100) of the present invention, a first processing unit (110) searches a road surface image captured by a vehicle-mounted camera for a "small area," which is composed of high- or low-luminance pixels and satisfies "eligibility conditions" on the "size," "shape," and "arrangement" in the road surface image. Additionally, a second processing unit (120) recognizes "lane edges" of the lane along which the vehicle travels on the basis of the "small area." Furthermore, a third processing unit (130) sets a "search range" of the small area searched by the first processing unit (110) on the basis of a result of the foregoing recognition of the lane edges by the second processing unit (120).

38 Claims, 9 Drawing Sheets

U.S. PATENT DOCUMENTS

| | | | |
|---|---|---|---|
| 2004/0091133 A1* | 5/2004 | Monji | 382/104 |
| 2006/0015252 A1* | 1/2006 | Yamamoto et al. | 701/301 |

FOREIGN PATENT DOCUMENTS

| | | |
|---|---|---|
| JP | 09-016751 | 1/1997 |
| JP | 11-147473 | 6/1999 |
| JP | 11-147481 | 6/1999 |
| JP | 2002-117392 | 4/2002 |
| JP | 2003-123058 | 4/2003 |
| JP | 2003-228711 | 8/2003 |
| JP | 2004-062519 | 2/2004 |
| JP | 2004-252827 | 9/2004 |

* cited by examiner

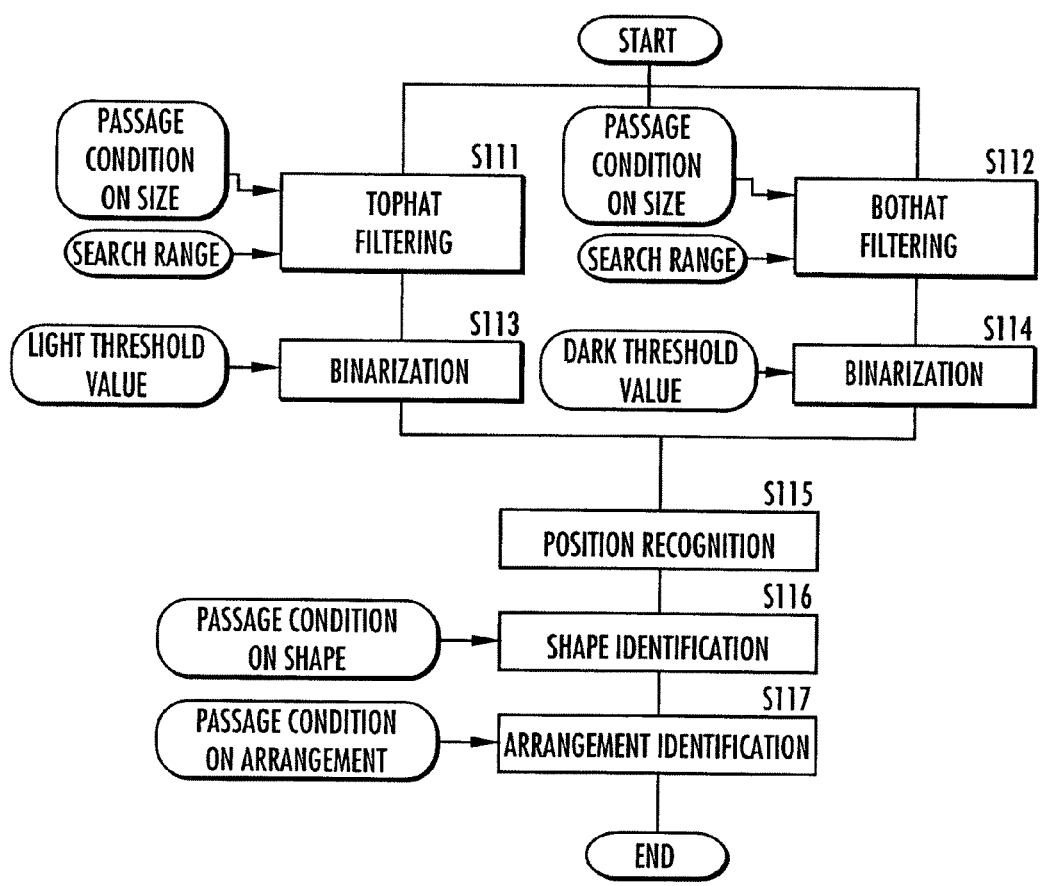

VEHICLE, IMAGE PROCESSING SYSTEM IMAGE PROCESSING METHOD, IMAGE PROCESSING PROGRAM, METHOD FOR CONFIGURING IMAGE PROCESSING SYSTEM, AND SERVER

CROSS-REFERENCE TO RELATED APPLICATION

This application is a National Stage entry of International Application No. PCT/JP2006/310156, filed May 22, 2006, the entire specification claims and drawings of which are incorporated herewith by reference.

TECHNICAL FIELD

The present invention relates to a vehicle, an image processing system, an image processing method, a program for giving the image processing functions concerned to a computer, a method for configuring the image processing system, and a server for performing the aforementioned method.

BACKGROUND ART

Conventionally, there has been suggested an image processing method for recognizing lane marks such as a white line on the basis of a road surface image ahead of a vehicle captured by a camera mounted on the vehicle (for example, refer to Japanese Patent Laid-Open No. Hei 11 (1999)-147473 and Japanese Patent Laid-Open No. Hei 11 (1999)-147481). A result of the recognition of the lane mark is used, for example, in order to control the lateral position of the vehicle with reference to the position of the lane marks which lie on either side of the vehicle. According to the conventional technology, the white lines (or their edges) are recognized by using a property that the luminance of the white lines in the road surface image is higher than the luminance of other portions in the road surface image.

DISCLOSURE OF THE INVENTION

Problem to be Solved by the Invention

Dotted lane marks lying like dots on both sides of a vehicle traffic lane such as Botts Dots shown in FIG. 10 are small and inconspicuous in comparison with lane marks which are long to some extent such as continuous or intermittent white or yellow lines, which leads to a difficulty in the recognition of the lane marks by means of image processing.

Therefore, it is an object of the present invention to provide an image processing system capable of accurately recognizing lane edges defined by dotted lane marks and an image processing method therefor, a vehicle equipped with the image processing system, a program for giving the image processing functions concerned to a computer, a method for configuring the image processing system, and a server for performing the method.

Means for Solving the Problem

To solve the above problem, according to the present invention, there is provided a vehicle equipped with: an imaging means; an image processing system which performs image processing on the basis of a road surface image captured by the imaging means; and a vehicle running condition control system which controls a running condition of the vehicle on the basis of a result of the image processing performed by the image processing system, wherein the image processing system includes: a first processing unit which searches for a small area composed of high- or low-luminance pixels and satisfying eligibility conditions; and a second processing unit which recognizes lane edges of a lane along which the vehicle travels on the basis of the small area found by the first processing unit; and wherein the eligibility conditions are those on the size, the size and shape, the size and arrangement, or the size, shape, and arrangement in the road surface image.

According to the vehicle of the present invention, in the image processing system mounted on the vehicle, the first processing unit searches for the "small area" in the road surface image captured by the imaging means mounted on the vehicle. Furthermore, the second processing unit recognizes the "lane edges" of the lane along which the vehicle travels on the basis of the "small area" found by the first processing unit. The "small area" is composed of high- or low-luminance pixels in the road surface image and satisfies the "eligibility conditions" and therefore it is likely to correspond to a dotted lane mark. The "eligibility conditions" are those on the size, the size and shape, the size and arrangement, or the size, shape, and arrangement in the road surface image. Therefore, the accuracy of recognizing the lane edges defined by the dotted lane marks can be improved by using the "small area" as the basis of the recognition. This allows the vehicle running condition control performed by the vehicle running condition control system based on a result of the recognition to be appropriate in view of an actual relative positional relationship between the vehicle and the lane edges or the like.

The eligibility condition on the size can be set on the basis of a standard size of a dotted lane mark and an actual distance on the road surface according to an interval between pixels in the road surface image determined according to the mounting state of the imaging means. The eligibility condition on the shape can be set on the basis of a standard shape of a dotted lane mark and the mounting state of the imaging means. Further, the eligibility condition on the arrangement can be set on the basis of an arrangement pattern of dotted lane marks and the mounting state of the imaging means.

The vehicle of the present invention further comprises a third processing unit which sets a search range of the small area searched by the first processing unit on the basis of a result of a previous search for the small area performed by the first processing unit, a result of previous recognition of the lane edges performed by the second processing unit, or standard arrangement information on dotted lane marks stored in a storage unit.

According to the vehicle of the present invention, the third processing unit in the image processing system sets the "search range" of the small area searched by the first processing unit on the basis of the result of a previous search for the small area performed by the first processing unit or the result of previous recognition of the lane edges of the lane, along which the vehicle travels, performed by the second processing unit. This allows the search range of the next small area in the road surface image to be appropriately limited in view of the previous search result of the small area or the like, whereby the accuracy of searching for the small area and consequently the accuracy of recognizing the lane edges can be improved with the omission of a search in an unnecessary range. It further allows the vehicle running condition control performed by the vehicle running condition control system based on the result of the recognition to be appropriate in view of an actual relative positional relationship between the vehicle and the lane edges or the like.

Moreover, the vehicle of the present invention is characterized in that the third processing unit sets the search range of the small area searched by the first processing unit on the basis of the standard arrangement information on the dotted lane marks stored in the storage unit if the small area is not previously found by the first processing unit or if the lane edges are not previously recognized by the second processing unit though the small area is previously found by the first processing unit.

According to the vehicle of the present invention, the search range of the small area is limited on the basis of the standard arrangement information on the dotted lane marks in the image processing system mounted on the vehicle. Therefore, the accuracy of searching for the small area and consequently the accuracy of recognizing the lane marks can be improved with the omission of a search in an unnecessary range, which thereby achieves an appropriate vehicle running condition control based on a result of the recognition.

Moreover, the vehicle of the present invention further comprises a third processing unit which sets the search range of the small area searched by the first processing unit to be smaller than in the case of the small area not previously found by the first processing unit if the small area is previously found by the first processing unit or which sets the search range of the small area searched by the first processing unit to be smaller than in the case of the lane edges not previously recognized by the second processing unit if the lane edges are previously recognized by the second processing unit.

According to the vehicle of the present invention, if the small area is previously found in the image processing system mounted on the vehicle, the position, shape, or the like of the next small area searched can be estimated on the basis of the position, shape, or the like of the foregoing small area. If the lane edges are previously recognized, the position, shape, or the like of the next small area searched can be estimated on the basis of the shape of the lane edges. The search range is set smaller in light of the circumstances, by which the accuracy of searching for the small area can be improved with the omission of unnecessary searches. On the other hand, unless the small area is previously found or unless the lane marks are recognized, the next search range of the small area is set to be wide, which increases the possibility of finding a small area whose position, shape, or the like cannot be estimated. According to the above discussion, the accuracy of searching for the small area and the accuracy of recognizing the lane marks can be improved, which allows the vehicle running condition control based on a result of the recognition to be appropriate.

Moreover, the vehicle of the present invention is equipped with a speed sensor and a yaw rate sensor and further comprises a third processing unit which sets the search range of the small area searched by the first processing unit on the basis of one or both of a vehicle speed measured by the speed sensor and a vehicle yaw rate measured by the yaw rate sensor.

According to the vehicle of the present invention, the search range of the small area is appropriately narrowed down by considering that the position of the dotted lane mark in the road surface image varies according to one or both of the vehicle speed and the yaw rate in the image processing system mounted on the vehicle. This improves the accuracy of searching for the small area and consequently the accuracy of recognizing the lane marks, which allows the vehicle running condition control based on a result of the recognition to be appropriate.

Moreover, the vehicle of the present invention is characterized in that the first processing unit sets one or both of a threshold value defining a high luminance level of a pixel and a threshold value defining a low luminance level of the pixel on the basis of a luminance average of pixels in the search range set by the third processing unit.

According to the vehicle of the present invention, a threshold value appropriate for extracting a dotted lane mark can be set by a binarization process in light of the inclination of the luminance that the search range is generally light or dark in the image processing system mounted on the vehicle. This improves the accuracy of searching for the small area and consequently the accuracy of recognizing the lane mark and allows the vehicle running condition control based on a result of the recognition to be appropriate.

Furthermore, the vehicle of the present invention is characterized by that the first processing unit performs one or both of a search for the small area composed of high-luminance pixels by performing a tophat filtering process and a search for the small area composed of low-luminance pixels by performing a bothat filtering process in the road surface image.

According to the vehicle of the present invention, the small area composed of high- or low-luminance pixels can be accurately extracted by performing the tophat filtering process or the bothat filtering process only if it has a size equal to or smaller than the standard size of a dotted lane mark or a given size determined in view of a distance from the imaging means or the like in the image processing system mounted on the vehicle. Therefore, the accuracy of recognizing the lane edge based on the small area can be improved, which thereby allows the vehicle running condition control based on a result of the recognition to be appropriate.

Moreover, the vehicle of the present invention is characterized in that the first processing unit corrects the eligibility conditions on the basis of a running speed of the vehicle and exposure time of the imaging means before searching for the small area satisfying the eligibility conditions.

According to the vehicle of the present invention, the small area can be searched after reducing or eliminating the influence of a blur on the size, the size and shape, the size and arrangement, or the size, shape, and arrangement, in consideration of the fact that the higher the running speed of the vehicle is and the longer the exposure time of the vehicle-mounted imaging means is, an object to be imaged in the road surface image blurs more in the image processing system mounted on the vehicle. This improves the accuracy of searching for the small area and consequently the accuracy of recognizing the lane mark, which thereby allows the vehicle running condition control based on a result of the recognition to be appropriate.

Furthermore, the vehicle of the present invention is characterized in that the first processing unit searches for only the small area composed of high-luminance pixels in the road surface image if the luminance average of a part or all of the pixels in the road surface image is equal to or lower than a night reference value.

According to the vehicle of the present invention, only the small area composed of high-luminance pixels is searched in an environment that decreases the accuracy of searching for a small area composed of low-luminance pixels such as, for example, in a situation where the surrounding of the vehicle is dark due to the decline of day or cloudy sky, in the image processing system of the present invention. This improves the accuracy of searching for the small area and consequently the accuracy of recognizing a lane mark, which thereby allows the vehicle running condition control based on a result of the recognition to be appropriate.

Furthermore, the vehicle of the present invention is characterized in that the second processing unit recognizes the outline of the dotted lane mark on the basis of the small area found by the first processing unit and a shading pattern of the dotted lane mark stored in the storage unit before recognizing the lane edge.

According to the vehicle of the present invention, the shading pattern of the dotted lane mark is considered in view of the fact that the shape of the small area searched based on the luminance does not match the shape of the dotted lane mark since the high- and low-luminance portions exist concurrently in the dotted lane mark, whereby the outline (shape) of the dotted lane mark can be accurately recognized in the image processing system mounted on the vehicle. This improves the accuracy of recognizing the lane edges defined by the dotted lane marks and allows the vehicle running condition control based on a result of the recognition to be appropriate.

Furthermore, the vehicle of the present invention is characterized in that the second processing unit preferentially recognizes a point close to the center of the vehicle traffic lane among points on the outline of the dotted lane mark as a part of the lane edge.

According to the vehicle of the present invention, the width of the lane along which the vehicle travels is recognized to be narrow in the image processing system mounted on the vehicle, which thereby allows the lateral position of the vehicle or the like to be appropriately controlled in view of an actual relative positional relationship between the vehicle and the lane edge.

To solve the above problem, according to the present invention, there is provided an on-vehicle image processing system comprising: a first processing unit which searches for a small area composed of high- or low-luminance pixels and satisfying eligibility conditions in a road surface image captured by imaging means mounted on a vehicle; and a second processing unit which recognizes lane edges of a lane along which the vehicle travels on the basis of the small area found by the first processing unit, wherein the eligibility conditions are those on the size, the size and shape, the size and arrangement, or the size, shape, and arrangement in the road surface image.

According to the image processing system of the present invention, the size or the like of the dotted lane mark is considered, which thereby allows the lane edges of the lane along which the vehicle travels defined by the actual dotted lane marks to be accurately recognized.

The image processing system of the present invention further comprises a third processing unit which sets a search range of the small area searched by the first processing unit on the basis of a result of a previous search for the small area performed by the first processing unit, a result of previous recognition of the lane edges performed by the second processing unit, or standard arrangement information on dotted lane marks stored in a storage unit.

Furthermore, the image processing system of the present invention is characterized in that the third processing unit sets the search range of the small area searched by the first processing unit on the basis of the standard arrangement information on the dotted lane marks stored in the storage unit if the small area is not previously found by the first processing unit or if the lane edges are not previously recognized by the second processing unit though the small area is previously found by the first processing unit.

Still further, the image processing system of the present invention further comprises a third processing unit which sets the search range of the small area searched by the first processing unit to be smaller than in the case of the small area not previously found by the first processing unit if the small area is previously found by the first processing unit or which sets the search range of the small area searched by the first processing unit to be smaller than in the case of the lane edges not previously recognized by the second processing unit if the lane edges are previously recognized by the second processing unit.

Furthermore, the image processing system of the present invention further comprises a third processing unit which sets the search range of the small area searched by the first processing unit on the basis of one or both of a vehicle speed measured by the speed sensor mounted on the vehicle and a vehicle yaw rate measured by the yaw rate sensor mounted on the vehicle.

Still further, the image processing system of the present invention is characterized in that the first processing unit sets one or both of a threshold value defining a high luminance level of a pixel and a threshold value defining a low luminance level of the pixel on the basis of a luminance average of pixels in the search range set by the third processing unit.

Furthermore, the image processing system of the present invention is characterized in that the first processing unit performs one or both of the search for the small area composed of high-luminance pixels by performing a tophat filtering process and the search for the small area composed of low-luminance pixels by performing a bothat filtering process in the road surface image.

Furthermore, the image processing system of the present invention is characterized in that the first processing unit corrects the eligibility conditions on the basis of a running speed of the vehicle and exposure time of the imaging means before searching for the small area satisfying the eligibility conditions.

Still further, the image processing system of the present invention is characterized in that the first processing unit searches for only the small area composed of high-luminance pixels in the road surface image if the luminance average of a part or all of the pixels in the road surface image is equal to or lower than a night reference value.

Moreover, the image processing system of the present invention is characterized in that the second processing unit recognizes the outline of the dotted lane mark on the basis of the small area found by the first processing unit and a shading pattern of the dotted lane mark stored in the storage unit before recognizing the lane edge.

Furthermore, the image processing system of the present invention is characterized in that the second processing unit preferentially recognizes a point close to the center of a vehicle traffic lane among points on the outline of the dotted lane mark as a part of the lane edge.

To solve the above problem, according to the present invention, there is provided an image processing method comprising: a first process of searching for a small area composed of high- or low-luminance pixels and satisfying eligibility conditions in a road surface image captured by imaging means mounted on a vehicle; and a second process of recognizing lane edges of a lane along which the vehicle travels on the basis of the small area found in the first process, wherein the eligibility conditions are those on the size, the size and shape, the size and arrangement, or the size, shape, and arrangement in the road surface image.

According to the image processing method of the present invention, the size or the like of the dotted lane mark is considered similarly to the image processing system, which allows accurate recognition of the lane edges of the lane along which the vehicle travels defined by the actual dotted lane marks.

To solve the above problem, according to the present invention, there is provided an image processing program which gives a computer: a first processing function of searching for a small area composed of high- or low-luminance pixels and satisfying eligibility conditions in a road surface image captured by imaging means mounted on a vehicle; and a second processing function of recognizing lane edges of a lane along which the vehicle travels on the basis of the small area found by the first processing function, wherein the eligibility conditions are those on the size, the size and shape, the size and arrangement, or the size, shape, and arrangement in the road surface image.

According to the image processing program of the present invention, it is possible to give a computer the functions allowing the computer to accurately recognize the lane edges of the lane along which the vehicle travels defined by the actual dotted lane marks in light of the size or the like of the dotted lane marks.

To solve the above problem, according to the present invention, there is provided a method of distributing or downloading a part or all of the image processing program to an in-vehicle computer to configure the image processing system. To solve the above problem, according to the present invention, there is provided a server which performs the method of configuring the image processing system.

According to each of the configuration method and the server of the present invention, it is possible to configure a system capable of accurately recognizing the lane edges of the lane along which the vehicle travels defined by the actual dotted lane marks at an arbitrary timing in view of the size or the like of the dotted lane marks.

BEST MODE FOR CARRYING OUT THE INVENTION

Preferred embodiments of a vehicle, an image processing system, an image processing method, and an image processing program according to the present invention will be described below with reference to the accompanying drawings.

The vehicle 10 shown in FIG. 1 is equipped with an electronic control unit (computer) 11, a camera (imaging means) 12 which captures a road surface image ahead of the vehicle 10, a speed sensor 13 which measures the running speed of the vehicle 10, and a yaw rate sensor 14 which measures the yaw rate of the vehicle 10.

The electronic control unit (having an in-vehicle computer and composed of a CPU, ROM, RAM, I/O and the like) 11 constitutes an image processing system 100, as hardware mounted on the vehicle 10, together with an "image processing program" of the present invention as software stored in a memory. Although the image processing program can be previously stored in the memory in the in-vehicle computer, alternatively it is possible to download or distribute a part or all of the image processing program to the in-vehicle computer via a network from a server 20 at a timing such as upon request from the vehicle 10 and then to store it into the memory. As a part of the program, for example, there is a packet constituting the program (file).

The electronic control unit 11 forms a "vehicle running condition control system" which controls a running condition including the lateral position of the vehicle 10 on the basis of an image processing result of the image processing system 100. The image processing system 100 includes a storage unit 101, a luminance measuring unit 102, a first processing unit 110, a second processing unit 120, and a third processing unit 130.

The storage unit 101 stores a standard size, a standard arrangement interval, and "eligibility conditions (of a small area corresponding to a dotted lane mark)" or the like described later.

The luminance measuring unit 102 measures the luminance of each pixel in the road surface image captured by the camera 12.

The first processing unit 110 searches the road surface image captured by the camera 12 mounted on the vehicle 10 for the "small area." The "small area" is composed of high- or low-luminance pixels in the road surface image and satisfies the "eligibility conditions" on the "size," "shape," and "arrangement" in the road surface image.

The second processing unit 120 recognizes the "lane edges" of the lane along which the vehicle 10 travels on the basis of the "small area" searched by the first processing unit 110.

The third processing unit 130 sets a "search range" of the small area searched by the first processing unit 110 on the basis of the result of a previous search for the small area by the first processing unit 110 and the result of previous recognition of the lane edges by the second processing unit 120.

The functions of the image processing system 100 having the above configuration, in other words, an image processing method of the present invention will be described below with reference to FIG. 2 to FIG. 8.

First, the first processing unit 110 performs a "first process" for searching the road surface image captured by the camera 12 for the small area (S110 in FIG. 2). The details of the first process will be described below with reference to FIG. 3.

Specifically, a tophat filtering process is performed for the road surface image (S111 in FIG. 3). This allows the extraction of a mass of pixel regions included in the "search range" set by the third processing unit 130, high in luminance of the road surface image measured by the luminance measuring unit 102, and having a size equal to or smaller than a reference size determined according to the "eligibility condition on the size" stored in the storage unit 101. The eligibility condition on the size is set in such a way that the reference size becomes smaller in the upward direction (farther direction from the camera 12) of the road surface image, in view of the fact that dotted lane marks farther from the camera 12 look smaller.

Furthermore, a bothat filtering process is performed for the road surface image (S112 in FIG. 3). This allows the extraction of a mass of pixel regions included in the "search range" set by the third processing unit 130, low in luminance of the road surface image measured by the luminance measuring unit 102, and having a size equal to or smaller than a reference size determined according to the "eligibility condition on the size" as described above.

As a specific example, discussion will be given below for the case where a plurality of rectangular search ranges A are set as shown in FIG. 4(a) with high-luminance small areas p1 to p3 and low-luminance small areas q1 to q3 located on the road surface. In this case, the small areas p1 to p3, which are included in the search ranges A respectively and satisfy the eligibility condition on the size set in view of the fact that dotted lane marks farther from the camera 12 look smaller as described above, can be extracted by the tophat filtering process. In addition, the small areas q1 to q3, which are included in the search ranges A respectively and satisfy the eligibility condition on the size, can be extracted by the bothat filtering process.

On the other hand, a small area q0 falling off the search range A is not considered as a target of the filtering process. Furthermore, although included in the search range A, a small area p0 is removed by the tophat filtering process since it is relatively large in light of the position in the road surface image and the standard size of a dotted lane mark and exceeds the size determined according to the eligibility condition on the size.

Therefore, the high-luminance small areas p1 to p3 and the low-luminance small areas q1 to q3 are extracted as shown in FIG. 4(b) on the basis of the road surface image shown in FIG. 4(a) by the tophat filtering process (S111 in FIG. 2) and the bothat filtering process (S112 in FIG. 2).

Furthermore, a binarization process is performed according to whether the luminance of each pixel in the road surface image processed by the tophat filtering is "equal to or higher than a light threshold value" or "lower than the light threshold value" (S113 in FIG. 3). This results in a binary image including a high-luminance (white) small area p as shown in FIG. 5(a) (each cell represents a pixel). The "light threshold value" can be individually set for each search range on the basis of an average luminance of the pixels or the like.

Similarly, the binarization process is performed according to whether the luminance of each pixel in the road surface image processed by the bothat filtering is "equal to or lower than a dark threshold value" or "higher than the dark threshold value" (S114 in FIG. 3). This results in a binary image including a low-luminance (black) small area q as shown in FIG. 5(b) (each cell represents a pixel). The "dark threshold value" can be individually set for each search range on the basis of an average luminance of the pixels or the like.

Subsequently, a "position recognition process" is performed to recognize the coordinates (position) of a representative point of the small area obtained by the binarization process (S115 in FIG. 3). As the representative point of the small area, a center-of-gravity of the small area, the leftmost point of the small area which lies to the right of the center of the screen, the rightmost point of the small area which lies to the left of the center of the screen, or the like can be recognized.

Furthermore, a "shape identification process" is performed to determine whether the small area obtained by the binarization process satisfies the "eligibility condition on the shape" (S116 in FIG. 3). The "eligibility condition on the shape" is set on the basis of a standard shape of a dotted lane mark and a camera mounting state (a height from the road surface or a tilt angle relative to the road surface). The eligibility condition on the shape includes, for example, a condition that the number of vertical overflow pixels from a reference area of Nx (horizontal)×Ny (vertical) contained in the small area is n1 or less or that the number of missing pixels in the reference area is n2 or less. The shape and size of the reference area, the number of overflow pixels, and the number of missing pixels can be set variably according to the vertical position in the road surface image, in other words, the distance from the camera 12 in the real space.

As a specific example, it is examined whether the small areas shown in FIGS. 6(a) to 6(d) satisfy the eligibility condition on the shape because the number of vertical overflow pixels from the reference area of 4×3 is 3 or less and the number of missing pixels in the reference area is 2 or less. In the case of a small area in FIG. 6(a) corresponding to the light area in FIG. 5(a), the number of vertical overflow pixels from the reference area (thick frame) is "0" and the number of missing pixels in the reference area is "0" and therefore the small area is determined to satisfy the eligibility condition on the shape. In the case of a small area in FIG. 6(b) corresponding to the dark area in FIG. 5(b), the number of vertical overflow pixels from the reference area is "1" and the number of missing pixels in the reference area is "0" and therefore the small area is determined to satisfy the eligibility condition on the shape. On the other hand, in the case of a small area in FIG. 6(c), the number of vertical overflow pixels from the reference area is "4," which is not 3 or less, and therefore the small area is not determined to satisfy the eligibility condition on the shape. In addition, in the case of a small area in FIG. 6(d), the number of missing pixels in the reference area is "3," which is not 2 or less, and therefore the small area is not determined to satisfy the eligibility condition on the shape. It is also possible to determine whether the eligibility condition on the shape is satisfied after matching to a representative point in such a way that, for example, the center-of-gravity location of the reference area of 4×3 matches the center-of-gravity of the small area whose coordinates are recognized by the position recognition process or the like.

Subsequently, an "arrangement identification process" is performed to determine whether the small area satisfies an "eligibility condition on the arrangement" (S117 in FIG. 3). The "eligibility condition on the arrangement" is set on the basis of the standard arrangement pattern of the dotted lane marks and the camera mounting state. The "eligibility condition on the arrangement" includes a condition that a distance between two small areas spaced apart from each other in the road surface image matches a standard interval in the horizontal direction of the lane between the dotted lane marks or in the longitudinal direction of the lane within a certain error range in light of an actual distance from the camera 12 to the small area. The interval between two small areas is calculated based on the interval between representative points such as the centers-of-gravity of the respective small areas whose coordinates are recognized by the position recognition process.

As a specific example, it is examined whether the eligibility condition on the arrangement is satisfied with regard to the small areas p1 to p3 sequentially arranged from the top on the left side of the road surface image shown in FIG. 7 and the small areas q1 to q3 sequentially arranged from the top on the right side of the road surface image. If an interval w1 between the small areas p1 and q1 and an interval w2 between the small areas p2 and q2 are appropriate in light of the standard interval between the dotted lane marks, the pair of the small areas p1 and q1 and the pair of the small areas p2 and q2 are determined to satisfy the "eligibility condition on the arrangement." On the other hand, if an interval w3 between the small areas p3 and q3 is inappropriate because it is too wide in comparison with the standard interval, the pair of the small areas p3 and q3 is not determined to satisfy the "eligibility condition on the arrangement."

Through the series of processes, for example, in the road surface image in FIG. 4(a), the small areas p1, p2, q1, and q2 are searched as small areas composed of high- or low-luminance pixels and satisfying the eligibility condition on the size, the eligibility condition on the shape, and the eligibility condition on the arrangement. This completes the first process of one cycle.

The higher the running speed of the vehicle 10 is and the longer the exposure time of the vehicle-mounted camera 12 is, an object to be imaged such as a reflector (dotted lane mark) M blurs more in the road surface image as shown in FIG. 9. In consideration of this point, the first processing unit 110 can correct a part or all of the eligibility condition on the size, the eligibility condition on the shape, and the eligibility condition on the arrangement on the basis of the running speed of the vehicle 10 and the exposure time of the camera 12 before searching for the small areas satisfying the eligibility condition on the size, the eligibility condition on the shape, and the eligibility condition on the arrangement. This allows a search for small areas after reducing or eliminating the influence of the blur on the size, shape, or arrangement of the object such as a dotted lane mark in the road surface image.

Subsequently, the second processing unit 120 performs a "second process" for recognizing the "lane edges" of the lane along which the vehicle travels on the basis of the "small areas" searched by the first processing unit 110 (S120 in FIG. 2). Specifically, parameters a, b, and the like in a basic equation Y=F(X, a, b, —) are calculated by the least squares approximation or other techniques on the basis of the coordinates of the representative points of the small areas searched by the first processing unit 110 and then the calculated parameters are assigned to the basic equation, by which the approximate expression Y=f(X) is derived. Thereby, left and right lane edges E1 and E2, which are determined by the approximate expression, are recognized, for example, on the basis of the dotted lane marks M arranged on either side of the lane as shown in FIG. 8.

The vehicle running condition control system (electronic control unit 11) controls the lateral position of the vehicle 10 on the basis of the left and right lane edges E1 and E2 recognized by the second processing unit 120. For example, the control method disclosed in the patent document 1 or 2 can be used as the above control method, and therefore the description thereof is omitted in this specification.

Furthermore, the third processing unit 130 performs a "third process" for setting the "search range" of the small area searched by the first processing unit 110 as shown in FIG. 4(*a*) on the basis of a result of the recognition of the lane edges recognized by the second processing unit 120 (S130 in FIG. 2). Specifically, the search range is set in such a way that the center-of-gravity of the search range is located on the lane edge recognized in a previous cycle by the second processing unit 120 and in such a way that the search range becomes smaller in the upward direction of the road surface image. Moreover, the search range can be set on the basis of one or both of the vehicle speed measured by the speed sensor 13 and the yaw rate measured by the yaw rate sensor 14.

On the other hand, unless the lane edges are recognized in the previous cycle by the second processing unit 120, the third processing unit 130 sets the search range of the small area on the basis of standard arrangement information of the dotted lane mark stored in the storage unit 101. In the setting, the size of the search range is set to be larger than in the case where the small area was found in the previous cycle by the first processing unit 110.

According to the image processing system 100 of the present invention fulfilling the above functions, the second processing unit 120 recognizes the lane edges defined by the dotted lane marks on the basis of the "small areas" searched by the first processing unit 110 (See E1 and E2 in FIG. 8). The small area is composed of high- or low-luminance pixels in the road surface image, satisfies the "eligibility conditions" on the "size," "shape," and "arrangement" in the road surface image, and is likely to correspond to a dotted lane mark. Therefore, it is possible to improve the accuracy of recognizing the lane edges defined by the dotted lane marks by using the small areas as a basis therefor.

Furthermore, the "search range" (see A in FIG. 4(*a*))" of the small area is set by the third processing unit 130 on the basis of a result of the recognition of the lane edges in the previous cycle. Thereby, the search range of the small area in the next cycle in the road surface image can be appropriately limited in view of the search result in the previous cycle of the small area or the like, which thereby improves the accuracy of searching for the small area and consequently the accuracy of recognizing the lane edges with the omission of searches in unnecessary ranges. Furthermore, it is possible to make control of the running condition of the vehicle 10 by the vehicle running condition control system based on a result of the recognition of the lane edges appropriate in light of the actual relative positional relationship between the vehicle 10 and the lane edges defined by the dotted lane marks.

In addition, the small area composed of high- or low-luminance pixels can be accurately extracted only if it has a certain size by performing the tophat filtering process (S111 in FIG. 3) and the bothat filtering process (S112 in FIG. 3) (See FIGS. 4(*a*) and 4(*b*)), which also improves the accuracy of recognizing the lane edges.

Moreover, the first processing unit 110 sets a threshold value which discriminates the high or low luminance of pixels on the basis of a luminance average of the pixels in the search range set by the third processing unit 130. This allows the setting of a threshold value appropriate for extracting the small area corresponding to the dotted lane mark by the binarization process in light of the inclination of the luminance that the search range is generally light or dark, whereby the accuracy of searching for the small area can be improved.

Furthermore, if the lane edges are recognized by the second processing unit 120 in the previous cycle, the search range of the small area searched by the first processing unit 110 is set to be smaller than in the case where the lane edges are not recognized by the second processing unit 120 in the previous cycle. If the lane edges are recognized in the previous cycle, the search range is set to be smaller in view of the fact that it is possible to estimate the position, shape, or the like of the next small area to be searched on the basis of the shape of the lane edge. This improves the accuracy of searching for the small area with the omission of unnecessary searches. On the other hand, unless the lane edges are recognized in the previous cycle, the next search range of the small area is set to be larger, which thereby increases the possibility of finding a small area whose position, shape, or the like cannot be estimated. The above improves the accuracy of searching for the small area and consequently the accuracy of recognizing the lane edges. Alternatively, whether the search range of the small area in the next cycle should be large or small can be determined according to whether the small area was found by the first processing unit 110 in the previous cycle.

Unless the lane edges are recognized in the previous cycle by the second processing unit 120, the search range of the small area searched by the first processing unit 110 is set on the basis of the standard arrangement information on the dotted lane marks stored in the storage unit 101. This allows a reasonable limitation on the search range of the small area, which thereby improves the accuracy of searching for the small area with the omission of searches in unnecessary ranges.

Moreover, the search range of the small area searched by the first processing unit 110 is set on the basis of the vehicle speed measured by the speed sensor 13 mounted on the vehicle 10 and the yaw rate measured by the yaw rate sensor 14 mounted on the vehicle 10. The search range of the small area is appropriately narrowed down by taking into consideration the fact that the position of a dotted lane mark in the road surface image varies according to the speed or yaw rate of the vehicle 10. This improves the accuracy of searching for the small area and consequently the accuracy of recognizing the lane edges. Alternatively, the search range of the small area can be set on the basis of one of the speed and yaw rate of the vehicle 10.

If the luminance average of a part or all of pixels in the road surface image is equal to or lower than a night reference value, the first processing unit 110 can search for only the small area composed of high-luminance pixels in the road surface image. Specifically, the bothat filtering process (S112 in FIG. 3) can be omitted while only the tophat filtering process is performed. According to the embodiment, only a small area composed of high-luminance pixels is searched in an environment that decreases the accuracy of searching for a small area composed of low-luminance pixels such as, for example, in a situation where the surrounding of the vehicle is dark due to the decline of day or cloudy sky. This improves the accuracy of searching for the small area and consequently the accuracy of recognizing lane edges.

In consideration of circumstances that the shape of the small area searched based on the luminance does not match the shape of the dotted lane mark since the high- and low-luminance portions exist concurrently in the dotted lane mark, the second processing unit 120 can recognize the outline of the dotted lane mark on the basis of the small area found by the first processing unit 110 and the shading pattern of the dotted lane mark stored in the storage unit 101 before recognizing the lane edge.

For example, on the basis of a shading pattern where a Botts Dot is shaded only in a diagonally downward right portion as shown in FIG. 11(a), the outline of the small area extended by a pixel (6, 1) and a pixel (7, 2) is recognized to be the outline of the Botts Dot in consideration of the shadow as shown in FIG. 11(b). In addition, an appropriate shading pattern can be selected out of a plurality of shading patterns of the dotted lane mark according to whether the small area composed of high-luminance pixels (or low-luminance pixels) exists on the right side of the lane or the left side thereof.

According to this embodiment, the outline (shape) of the dotted lane mark can be accurately recognized by considering the shading pattern of the dotted lane mark, which thereby improves the accuracy of recognizing the lane edges defined by the dotted lane marks.

Moreover, the second processing unit 120 can recognize a point closest to the center of the vehicle traffic lane in the outline of the dotted lane mark as a part of the lane edge. According to this embodiment, the width of the lane along which the vehicle 10 travels is recognized to be narrow, which thereby allows the running condition of the vehicle 10 to be appropriately controlled in view of an actual relative positional relationship between the vehicle 10 and the lane edge.

Although the first process is performed with the result of the third process reflected thereon in the above embodiment, alternatively the first process can be performed for the entire road surface image with the third process omitted as another embodiment.

Although the small area satisfying the eligibility conditions on all of the "size," "shape," and "arrangement" in the road surface image is extracted in the first process in the above embodiment, it is also possible to extract a small area satisfying the eligibility condition on the "size," the eligibility conditions on the "size" and "shape," or the eligibility conditions on the "size" and "arrangement" in the road surface image in the first process as another embodiment.

Although only the search range set in the previous cycle by the third processing unit 130 in the road surface image is considered to be a range for the tophat process (S111 in FIG. 3) and the bothat process (S112 in FIG. 3) in the next cycle in the above embodiment (see FIG. 4(a)), alternatively it is possible to consider the entire road surface image to be a range for the tophat process and the bothat process and then to narrow down a range of the road surface image for the position recognition process (S115 in FIG. 3), the shape identification process (S116 in FIG. 3), or the arrangement identification process (S117 in FIG. 3) to the search range set in the previous cycle by the third processing unit 130.

BRIEF DESCRIPTION OF THE DRAWINGS

FIG. 3 is an explanatory diagram of a first process;

Figure 1:
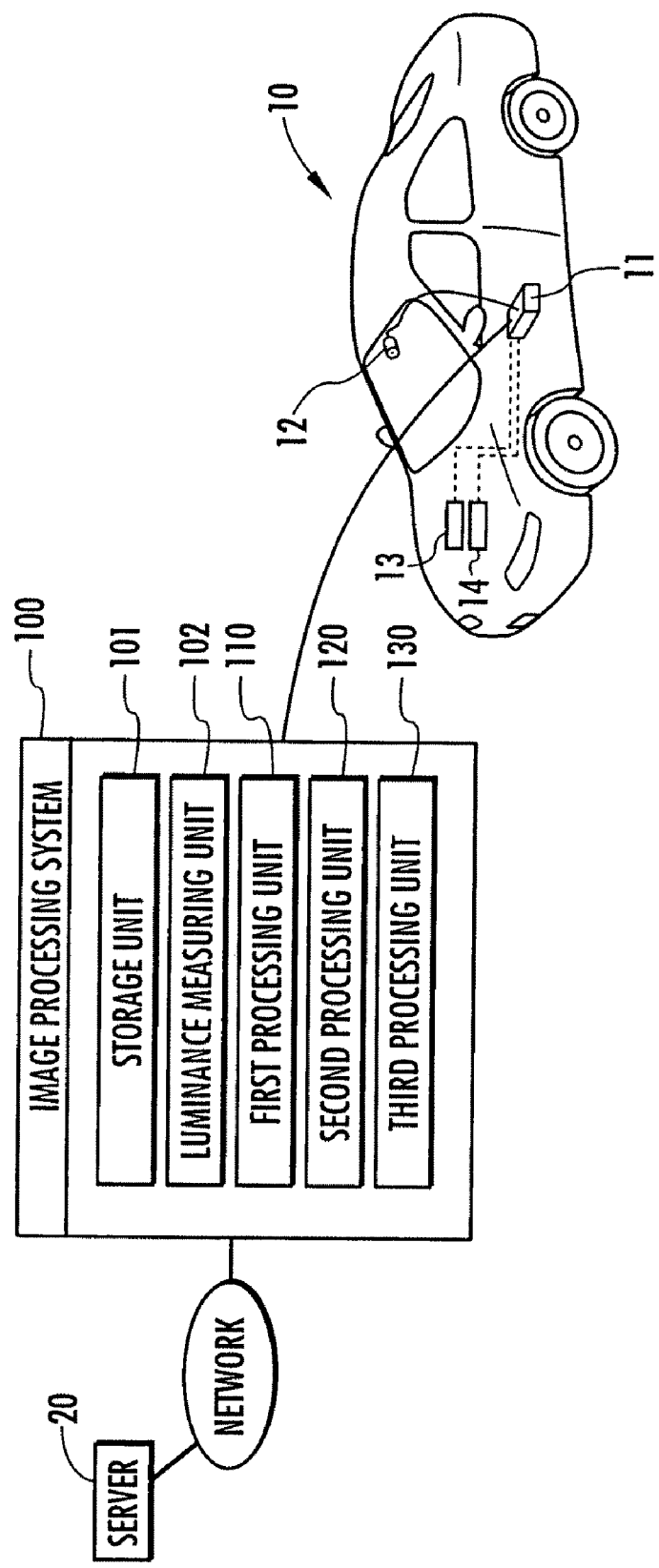
FIG. 1 is a configuration schematic diagram of an image processing system and a vehicle equipped therewith according to one embodiment of the present invention.
Figure 2:
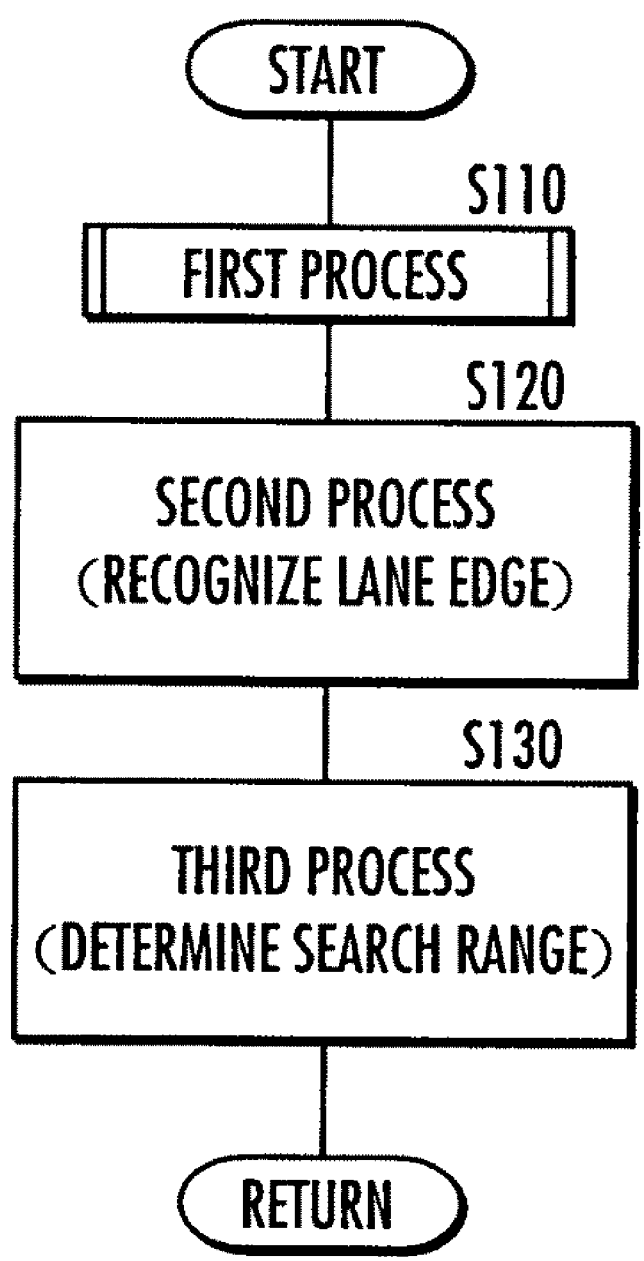
FIG. 2 is an explanatory diagram of an image processing method according to one embodiment of the present invention.
Figure 4A:
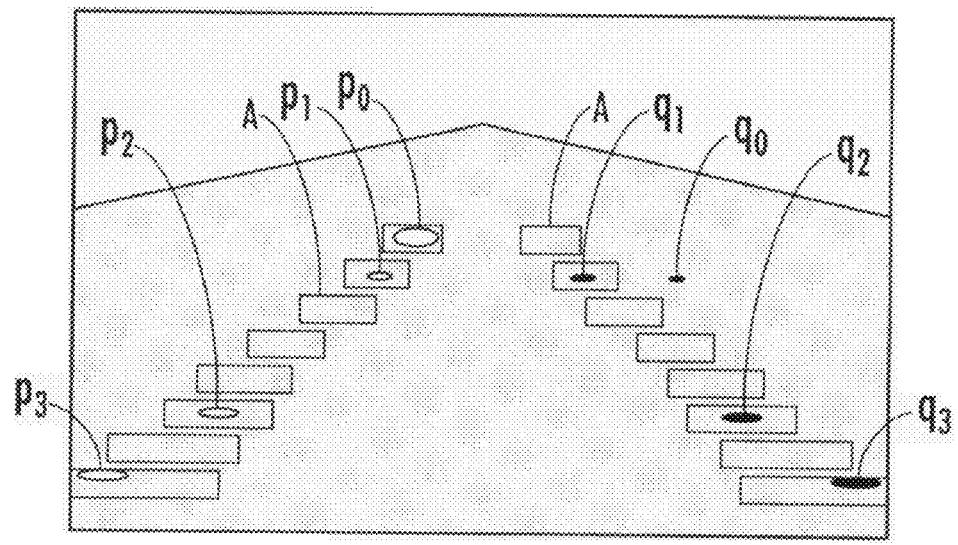
FIG. 4 is an explanatory diagram of a filtering process for a road surface image.
Figure 4B:
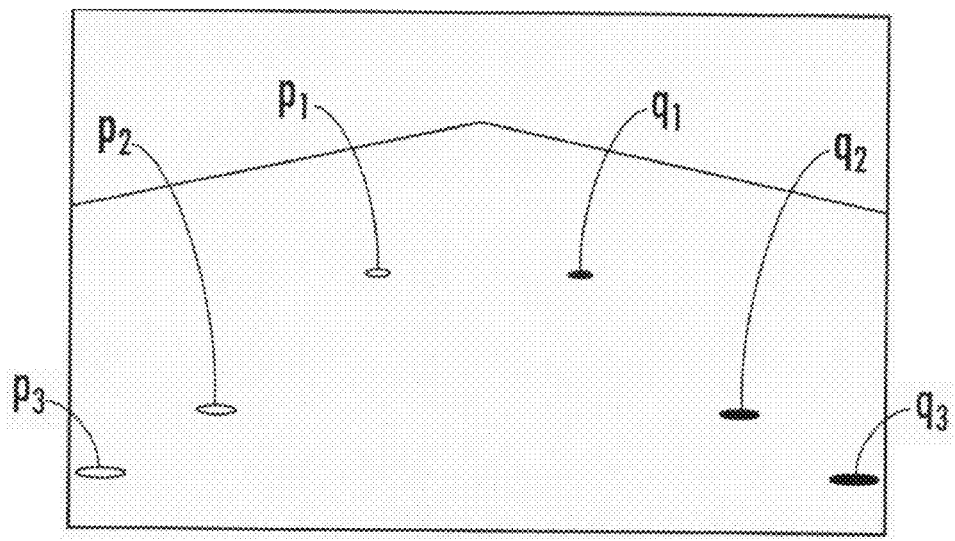
Figure 5A:
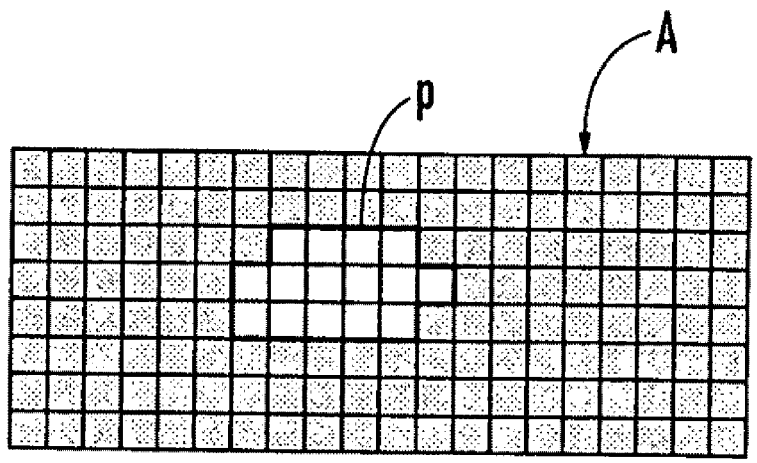
FIG. 5 is an illustrative diagram of a small area obtained by a binarization process after the filtering process.
Figure 5B:
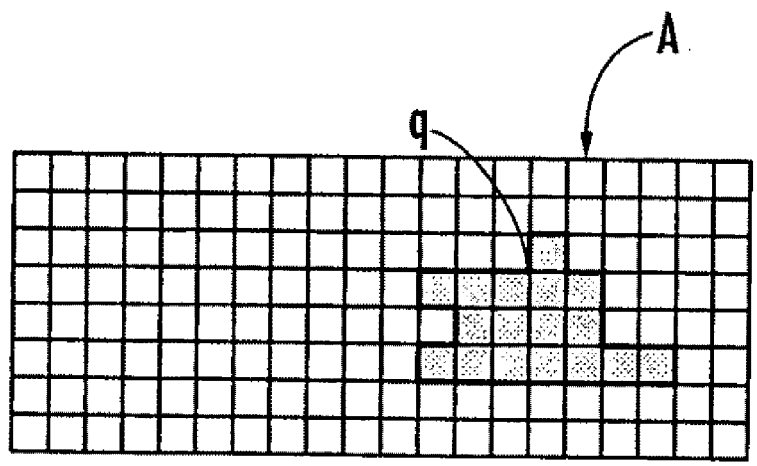
Figure 6A:
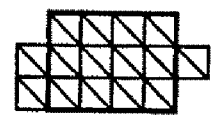
FIG. 6 is an explanatory diagram of a shape identification process.
Figure 6B:
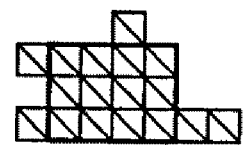
Figure 6C:
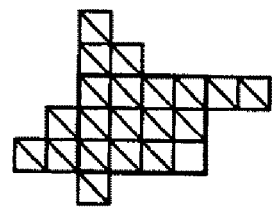
Figure 6D:
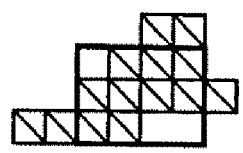
Figure 7:
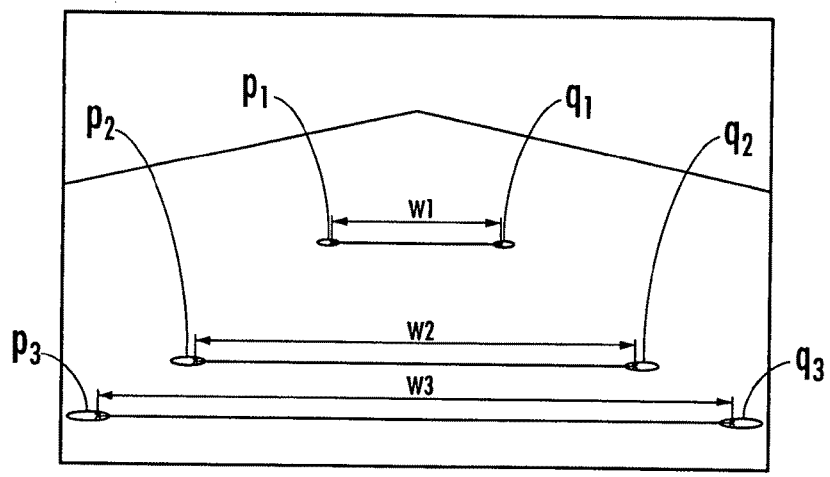
FIG. 7 is an explanatory diagram of an arrangement identification process.
Figure 8:
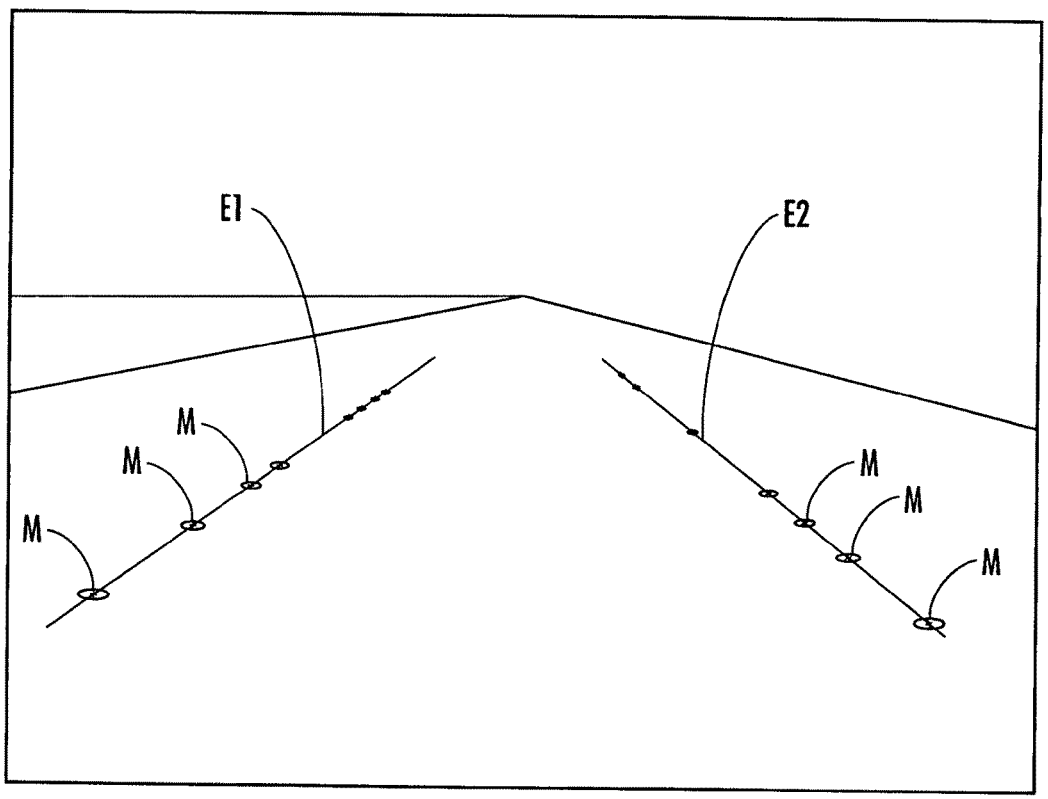
FIG. 8 is an illustrative diagram of lane edges recognized by a second process.
Figure 9:
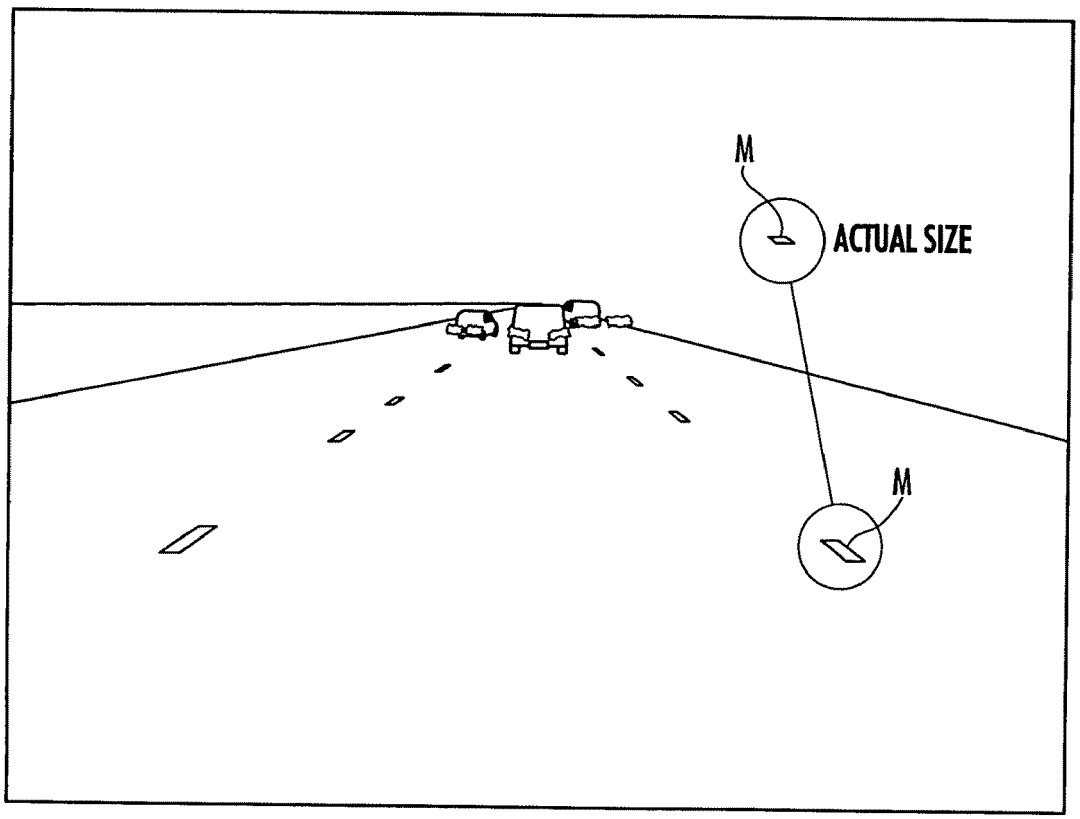
FIG. 9 is an illustrative diagram of a road surface image including reflectors.
Figure 10:
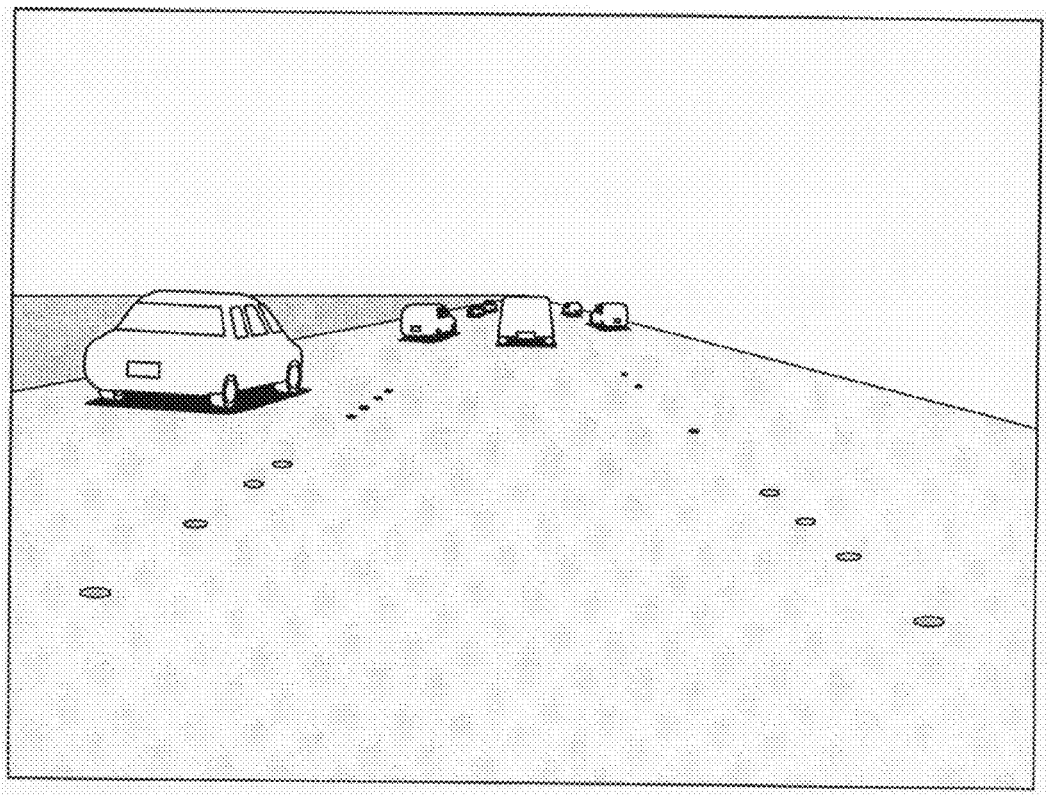
FIG. 10 is an illustrative diagram of a road surface image including Botts Dots.
Figure 11A:
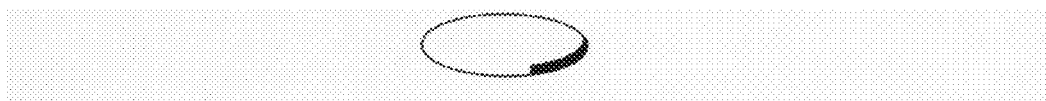
FIG. 11 is an illustrative diagram showing a shading pattern of a Botts Dot and a correction of a small area.
Figure 11B:
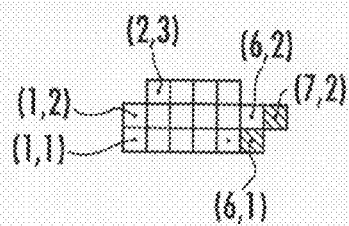

The invention claimed is:

1. A vehicle equipped with:
   an imaging means;
   an image processing system which performs image processing on the basis of a road surface image captured by the imaging means; and
   a vehicle running condition control system which controls a running condition of the vehicle on the basis of a result of the image processing performed by the image processing system,
   wherein the image processing system includes:
   a first processing unit which searches for a first small area composed of high-luminance pixels and satisfying eligibility conditions and a second small area composed of low-luminance pixels and satisfying eligibility conditions; and
   a second processing unit which recognizes lane edges of a lane along which the vehicle travels on the basis of the first and second small areas found by the first processing unit;
   wherein the high-luminance pixels with a luminance equal to or higher than a light threshold value have a higher luminance than a first luminance of the road surface image, and the low-luminance pixels with a luminance equal to or lower than a dark threshold value have a lower luminance than a second luminance of the road surface image, and
   wherein the eligibility conditions are those on the size, the size and shape, the size and arrangement, or the size, shape, and arrangement in the road surface image.

2. The vehicle according to claim 1, further comprising a third processing unit which sets a search range of the first and second small areas searched by the first processing unit on the basis of:
   a result of a previous search for the first and second small areas performed by the first processing unit, a result of previous recognition of the lane edges performed by the second processing unit, or standard arrangement information on dotted lane marks stored in a storage unit.

3. The vehicle according to claim 2, wherein the third processing unit sets the search range of the first and second small areas searched by the first processing unit on the basis of the standard arrangement information on the dotted lane marks stored in the storage unit if the first and second small areas are not previously found by the first processing unit or if the lane edges are not previously recognized by the second processing unit though the first and second small areas are previously found by the first processing unit.

4. The vehicle according to claim 1, further comprising a third processing unit which sets the search range of the first and second small areas searched by the first processing unit to be smaller than in the case of the first and second small areas not previously found by the first processing unit if the first and second small areas are previously found by the first processing unit, or which sets the search range of the first and second small areas searched by the first processing unit to be smaller than in the case of the lane edges not previously recognized by the second processing unit if the lane edges are previously recognized by the second processing unit.

5. The vehicle according to claim 1, which is equipped with a speed sensor and a yaw rate sensor, further comprising a third processing unit which sets the search range of the first and second small areas searched by the first processing unit on the basis of one or both of a vehicle speed measured by the speed sensor and a vehicle yaw rate measured by the yaw rate sensor.

6. The vehicle according to claim 2, wherein the first processing unit sets one or both of a threshold value defining a high luminance level of a pixel and a threshold value defining a low luminance level of the pixel on the basis of a luminance average of pixels in the search range set by the third processing unit.

7. The vehicle according to claim 1, wherein the first processing unit performs one or both of a search for the first small area composed of high-luminance pixels by performing a tophat filtering process and a search for the second small area composed of low-luminance pixels by performing a bothat filtering process in the road surface image.

8. The vehicle according to claim 1, wherein the first processing unit corrects the eligibility conditions on the basis of a running speed of the vehicle and exposure time of the imaging means before searching for the first and second small areas satisfying the eligibility conditions.

9. The vehicle according to claim 1, wherein the first processing unit searches for only the first small area composed of high-luminance pixels in the road surface image if the luminance average of a part or all of the pixels in the road surface image is equal to or lower than a night reference value.

10. The vehicle according to claim 1, wherein the second processing unit recognizes the outline of the dotted lane mark on the basis of the first and second small areas found by the first processing unit and a shading pattern of the dotted lane mark stored in the storage unit before recognizing the lane edge.

11. The vehicle according to claim 10, wherein the second processing unit preferentially recognizes a point close to the center of the vehicle traffic lane among points on the outline of the dotted lane mark as a part of the lane edge.

12. An image processing system comprising:

a first processing unit which searches for a first small area composed of high-luminance pixels and satisfying eligibility conditions and a second small area composed of low-luminance pixels and satisfying eligibility conditions in a road surface image captured by imaging means mounted on a vehicle; and a second processing unit which recognizes lane edges of a lane along which the vehicle travels on the basis of the first and second small areas found by the first processing unit, wherein the high-luminance pixels with a luminance equal to or higher than a light threshold value have a higher luminance than a first luminance of the road surface image, and the low-luminance pixels with a luminance equal to or lower than a dark threshold value have a lower luminance than a second luminance of the road surface image, wherein the eligibility conditions are those on the size, the size and shape, the size and arrangement, or the size, shape, and arrangement in the road surface image.

13. The image processing system according to claim 12, further comprising a third processing unit which sets a search range of the first and second small areas searched by the first processing unit on the basis of a result of a previous search for the first and second small areas performed by the first processing unit, a result of previous recognition of the lane edges performed by the second processing unit, or standard arrangement information on dotted lane marks stored in a storage unit.

14. The image processing system according to claim 13, wherein the third processing unit sets the search range of the first and second small areas searched by the first processing unit on the basis of the standard arrangement information on the dotted lane marks stored in the storage unit if the first and second small areas are not previously found by the first processing unit, or if the lane edges are not previously recognized by the second processing unit though the first and second small areas are previously found by the first processing unit.

15. The image processing system according to claim 12, further comprising a third processing unit which sets the search range of the first and second small areas searched by the first processing unit smaller than in the case of the first and second small areas not previously found by the first processing unit if the first and second small areas are previously found by the first processing unit or which sets the search range of the first and second small areas searched by the first processing unit to be smaller than in the case of the lane edges not previously recognized by the second processing unit if the lane edges are previously recognized by the second processing unit.

16. The image processing system according to claim 12, further comprising a third processing unit which sets the search range of the first and second small areas searched by the first processing unit on the basis of one or both of a vehicle speed measured by a speed sensor mounted on the vehicle and a vehicle yaw rate measured by a yaw rate sensor mounted on the vehicle.

17. The image processing system according to claim 13, wherein the first processing unit sets one or both of a threshold value defining a high luminance level of a pixel and a threshold value defining a low luminance level of the pixel on the basis of a luminance average of pixels in the search range set by the third processing unit.

18. The image processing system according to claim 12, wherein the first processing unit performs one or both of the search for the first small area composed of high-luminance pixels by performing a tophat filtering process and the search for the second small area composed of low-luminance pixels by performing a bothat filtering process in the road surface image.

19. The image processing system according to claim 12, wherein the first processing unit corrects the eligibility conditions on the basis of a running speed of the vehicle and exposure time of the imaging means before searching for the first and second small areas satisfying the eligibility conditions.

20. The image processing system according to claim 12, wherein the first processing unit searches for only the first small area composed of high-luminance pixels in the road surface image if the luminance average of a part or all of the pixels in the road surface image is equal to or lower than a night reference value.

21. The image processing system according to claim 12, wherein the second processing unit recognizes the outline of the dotted lane mark on the basis of the first and second small areas found by the first processing unit and a shading pattern of the dotted lane mark stored in the storage unit before recognizing the lane edge.

22. The image processing system according to claim 21, wherein the second processing unit preferentially recognizes a point close to the center of a vehicle traffic lane among points on the outline of the dotted lane mark as a part of the lane edge.

23. An image processing method comprising:
a first process of searching for a first small area composed of high-luminance pixels and satisfying eligibility conditions and a second small area composed of low-luminance pixels and satisfying eligibility conditions in a road surface image captured by imaging means mounted on a vehicle; and
a second process of recognizing lane edges of a lane along which the vehicle travels on the basis of the first and second small areas found in the first process,
wherein the high-luminance pixels with a luminance equal to or higher than a light threshold value have a higher luminance than a first luminance of the road surface image, and the low-luminance pixels with a luminance equal to or lower than a dark threshold value have a lower luminance than a second luminance of the road surface image,
wherein the eligibility conditions are those on the size, the size and shape, the size and arrangement, or the size, shape, and arrangement in the road surface image.

24. An image processing program embedded in a non-transitory medium, the image processing program causing a computer to perform:
a first processing function of searching for a first small area composed of high-luminance pixels and satisfying eligibility conditions and a second small area composed of low-luminance pixels and satisfying eligibility conditions in a road surface image captured by imaging means mounted on a vehicle; and
a second processing function of recognizing lane edges of a lane along which the vehicle travels on the basis of the first and second small areas found by the first processing function,
wherein the high-luminance pixels with a luminance equal to or higher than a light threshold value have a higher luminance than a first luminance of the road surface image, and the low-luminance pixels with a luminance equal to or lower than a dark threshold value have a lower luminance than a second luminance of the road surface image,
wherein the eligibility conditions are those on the size, the size and shape, the size and arrangement, or the size, shape, and arrangement in the road surface image.

25. The image processing program according to claim 24, wherein part of all of the program is downloaded to an in-vehicle computer.

26. The image processing program according to claim 24, wherein the program is hosted on a server.

27. The vehicle according to claim 1, wherein the first processing unit is configured to correct the eligibility conditions for adjusting the road surface image in connection with a reflectivity of the lane along which the vehicle travels.

28. The vehicle according to claim 1, wherein the first processing unit is configured to correct at least a portion of the eligibility conditions on the size, the eligibility conditions on the shape, and the eligibility conditions on the arrangement based at least in part on the running speed of the vehicle and an exposure time of a camera of the imaging means.

29. The vehicle according to claim 1, wherein the eligibility conditions at least comprise a condition that a number of overflow pixels from a reference area is n1 or less, or that a number of missing pixels in the reference area is n2 or less.

30. The image processing system according to claim 12, wherein the first processing unit is configured to correct the eligibility conditions for adjusting the road surface image in connection with a reflectivity of the lane along which the vehicle travels.

31. The image processing system according to claim 12, wherein the first processing unit is configured to correct at least a portion of the eligibility conditions on the size, the eligibility conditions on the shape, and the eligibility conditions on the arrangement based at least in part on the running speed of the vehicle and an exposure time of a camera of the imaging means.

32. The image processing system according to claim 12, wherein the eligibility conditions at least comprise a condition that a number of overflow pixels from a reference area is n1 or less, or that a number of missing pixels in the reference area is n2 or less.

33. The image processing method according to claim 23, wherein the first process further comprises correcting the eligibility conditions for adjusting the road surface image in connection with a reflectivity of the lane along which the vehicle travels.

34. The image processing method according to claim 23, wherein the first process further comprises correcting at least a portion of the eligibility conditions on the size, the eligibility conditions on the shape, and the eligibility conditions on the arrangement based at least in part on the running speed of the vehicle and an exposure time of a camera of the imaging means.

35. The image processing method according to claim 23, wherein the eligibility conditions at least comprise a condition that a number of overflow pixels from a reference area is n1 or less, or that a number of missing pixels in the reference area is n2 or less.

36. The image processing program according to claim 24, wherein the first processing function further comprises correcting the eligibility conditions for adjusting the road surface image in connection with a reflectivity of the lane along which the vehicle travels.

37. The image processing program according to claim 24, wherein the first processing function further comprises correcting at least a portion of the eligibility conditions on the size, the eligibility conditions on the shape, and the eligibility conditions on the arrangement based at least in part on the running speed of the vehicle and an exposure time of a camera of the imaging means.

38. The image processing program according to claim 24, wherein the eligibility conditions at least comprise a condition that a number of overflow pixels from a reference area is n1 or less, or that a number of missing pixels in the reference area is n2 or less.

* * * * *